United States Patent
Krink et al.

(10) Patent No.: US 7,326,875 B2
(45) Date of Patent: Feb. 5, 2008

(54) METHOD FOR SUPPLYING A PLASMA TORCH WITH A GAS, MIXED GAS, OR GAS MIXTURE, COMPRISING VOLUMETRIC FLOW REGULATION IN COMBINATION WITH PRESSURE REGULATION; AND ARRANGEMENT FOR CARRYING OUT SAID METHOD

(75) Inventors: Volker Krink, Finsterwalde (DE); Gerhard Irrgang, Finsterwalde (DE); Frank Laurisch, Finsterwalde (DE); Thomas Steudtner, Sonnewalde (DE)

(73) Assignee: Kjellberg Finsterwalde Elektroden und Maschinen GmbH, Finsterwalde (DE)

( * ) Notice: Subject to any disclaimer, the term of this patent is extended or adjusted under 35 U.S.C. 154(b) by 0 days.

(21) Appl. No.: 10/564,170

(22) PCT Filed: Jul. 6, 2004

(86) PCT No.: PCT/DE2004/001442

§ 371 (c)(1),
(2), (4) Date: Jan. 10, 2006

(87) PCT Pub. No.: WO2005/007332

PCT Pub. Date: Jan. 27, 2005

(65) Prior Publication Data
US 2006/0186094 A1    Aug. 24, 2006

(30) Foreign Application Priority Data
Jul. 11, 2003   (DE) ................. 103 32 569

(51) Int. Cl.
*H05B 1/02*    (2006.01)
(52) U.S. Cl. .................. 219/121.59; 219/121.54; 219/121.55; 219/121.51
(58) Field of Classification Search .......... 219/121.55, 219/121.56, 121.57, 121.54, 75, 121.51
See application file for complete search history.

(56) References Cited

U.S. PATENT DOCUMENTS

| 5,170,033 A | * | 12/1992 | Couch et al. ........... 219/121.51 |
| 6,206,878 B1 | * | 3/2001 | Bishop et al. ................. 606/49 |
| 6,232,575 B1 | | 5/2001 | Oakley et al. ......... 219/121.55 |

(Continued)

FOREIGN PATENT DOCUMENTS

DE          55437          12/1966

(Continued)

*Primary Examiner*—Mark Paschall
(74) *Attorney, Agent, or Firm*—Jon L. Woodard; Edward W. Goebel, Jr.; MacDonald Illig Jones & Britton LLP

(57) ABSTRACT

A method of supplying a plasma torch with a gas, mixed gas or gas mixture, in which the volume flow of the gas, mixed gas or gas mixture is controlled, characterised in that the volume flow control is effected in combination with a pressure control of the gas, mixed gas or gas mixture in such a way that the pressure control is used to adjust the level of the total volume flow through the nozzle of the plasma torch, and the volume flow control is used to adjust the volume flow portions producing the total volume flow, taking the desired gas composition into account, and an arrangement for carrying out said method.

34 Claims, 4 Drawing Sheets

U.S. PATENT DOCUMENTS

| | | | |
|---|---|---|---|
| 6,359,251 B1 | 3/2002 | Picard et al. ........... | 219/121.57 |
| 2003/0034334 A1* | 2/2003 | Furujo ................... | 219/121.55 |

FOREIGN PATENT DOCUMENTS

| | | |
|---|---|---|
| DE | 132247 | 9/1978 |
| DE | 195 36 150 C2 | 9/1997 |
| DE | 201 21 641.8 | 3/2003 |
| EP | 0 697 935 | 4/1999 |
| JP | 10263827 | 10/1998 |

\* cited by examiner

METHOD FOR SUPPLYING A PLASMA TORCH WITH A GAS, MIXED GAS, OR GAS MIXTURE, COMPRISING VOLUMETRIC FLOW REGULATION IN COMBINATION WITH PRESSURE REGULATION; AND ARRANGEMENT FOR CARRYING OUT SAID METHOD

BACKGROUND

The present invention relates to a method of supplying a plasma torch with a gas, mixed gas or gas mixture, in which the volume flow of the gas, mixed gas or gas mixture is controlled. In addition, the present invention relates to an arrangement for supplying a plasma torch with a gas or mixed gas or gas mixture, with an arrangement for delivering the gas or mixed gas or gas mixture to the plasma torch and a volume flow control for controlling the volume flow of the gas or mixed gas or gas mixture.

Various gases are used as plasma gases, such as monatomic argon and/or the diatomic gases hydrogen, nitrogen, oxygen or air. These gases are ionized and dissociated by the energy of the plasma arc. A plasma mixed gas is a plasma gas that has already been premixed by the supplier, whereas a plasma gas mixture is a plasma gas that is mixed on the spot.

As a rule, the plasma in a plasma torch is constricted by a water-cooled nozzle. In this way, energy densities of up to $2 \times 10^6$ W/cm$^2$ can be achieved. In the plasma arc of a plasma torch, temperatures of up to 30,000° C. arise, which, in combination with the high flow rate of the plasma gas, result in very high cutting speeds in all electrically conductive materials.

For a plasma cutting process, a pilot arc is first ignited between the nozzle and the cathode of the plasma torch with a high voltage. This low-energy pilot arc prepares the path between the plasma cutting torch and the work piece using partial ionisation. When the pilot arc touches the work piece, a cutting arc forms.

Plasma cutting is an established method of cutting electrically conductive materials. Depending on the cutting task, various gases and gas mixtures are used. Conventional gases and gas mixtures are, for example, air, oxygen, nitrogen and their gas mixtures, and also argon/hydrogen/nitrogen mixtures.

Unalloyed steels are normally cut with air or oxygen. Alloyed steels and non-ferrous metals are preferably cut with special argon/hydrogen, nitrogen/hydrogen or argon/hydrogen/nitrogen mixtures. In order to improve the quality of a cut, an additional secondary gas can also be employed, which also flows around the plasma jet. The function of the additional secondary gas is to protect the nozzle of the plasma torch against material from the work piece splashing back when piercing the work piece, thus protecting against damage. The additional secondary gas also influences the molten metal during cutting in such a way that the cut produced is free of dross and acts as a shield gas to protect the surface of the cut, which is still hot after it has been cut, against oxidation.

The plasma and secondary gases, mixed gases and gas mixtures are delivered to the plasma cutting torches via lines and solenoid valves. Gases are usually metered by setting or adjusting pressure. Pressure can be controlled either mechanically via pressure reducers, or electronically via pressure control valves. The use of electronic pressure regulators is common, especially in automated systems, in which a wide range of plasma cutting parameters, such as cutting current, cutting voltage, gas pressure, cutting rate, the thickness of the material and plasma cutting torch distance are stored in databases in order to achieve the greatest possible reproducibility of cutting results.

German document DE 195 36 150 C2, for example, describes a means and method for gas control in a plasma torch, in which gas flow is set by an arrangement consisting of a proportional valve, a pressure sensor and a shield in a plasma torch.

In European Patent Specification EP 0 697 935 B1, gas is metered by means of changeable needle valves. The cross-section of the needle valves, in combination with the pressure set, determines the amount of gas. Volume flow can be indicated in the process by means of variable-area flow meters.

Particular gas mixtures needed for processing alloyed steels and non-ferrous metals cannot however be reproducibly generated by means of pressure control. Attempts have therefore been made to reduce this disadvantage by using auxiliary devices. East German document DD 54437, for example, describes the use of a mixing chamber with pressure shields. However, this does not solve the problem since the resulting mixing ratio is very restricted.

It is particularly difficult to mix gases of different densities and in widely varying mixing ratios. For example, even the use of various known mixing devices, including T-fittings, injectors, labyrinth arrangements and arrangements of nozzles, as are described in East German Document DD 132247, cannot produce the varying optimum mixing ratios required.

It is possible to perform gas metering by means of pure volume flow control. This method can reproducibly create defined gas mixtures.

U.S. Pat. No. 6,248,972 B1 discloses a method and arrangement for reducing electrode and nozzle wear in oxygen plasma cutting by using a mixture of oxygen and nitrogen instead of pure oxygen. In the method, a constant volume flow of the individual plasma gases is produced by means of an arrangement consisting of needle valves and differential pressure gauges, such that the differential pressure upstream and downstream of the differential pressure gauges is kept constant by means of the needle valves upstream. Between the controlled member and the plasma torch there are pressure-reducing valves, which limit the maximum supply pressure to the plasma torch.

German utility model DE 201 21 641.8 U1 describes a method of supplying a plasma torch with a gas, mixed gas, or gas mixture, in which the volume flow of the gas, mixed gas, or gas mixture is controlled, using an arrangement for supplying a plasma torch with a gas or mixed gas or gas mixture with a means for delivering the gas or mixed gas or gas mixture to the plasma torch and a volume flow control means for controlling the volume flow of the gas or mixed gas or gas mixture.

However, even if a volume flow control is able, depending on the measuring method used, to generate a more or less constant volume flow of a gas or gases and can consistently and accurately reproduce such a gas mixture, the quality of a resulting cut is inadequate. This is especially true at the start of cutting a given material. Such inadequate quality cuts can take various forms. A lack of or delayed transfer of a pilot arc can lead to unreliable piercing of a work piece to be cut. In some cases, unreliable through cuts can occur and material can be left behind on the work piece. The formation of dross can occur and slag can form on the underside of the work piece. A major deviation in the desired angle can also lead to exceeding the tolerances of a desired right angle or slope of the work piece.

SUMMARY

A method of supplying a plasma torch with one or more plasma gases allows the volume flow of gas to be controlled. The method involves determining a desired composition of the one or more gases to be supplied to the plasma torch, and providing, from at least one gas source, a volume of the desired composition of the plasma gas or gases. Volume flow control of the plasma gas or gases to the plasma torch is effected by using pressure control to adjust the level of the total volume of the plasma gas or gases flowing through the plasma torch and by using volume flow control to adjust volume flow portions producing the total volume flow of the plasma gas or gases flowing through the plasma torch. This allows for the production of the desired composition of the plasma gas or gases. Secondary gases can also be supplied to the plasma torch. In some embodiments, volume flow can also be controlled in a manner analogous to the control of the supplied plasma gases.

An arrangement for supplying a plasma torch with a gas or gases allows the volume of the gas or gases to be controlled. The arrangement includes at least one gas source for providing the gas or gases to be supplied and at least one volume flow portion producing a total volume flow of the gas or gases. An effected volume flow control controls volume flow of the gas or gases, using pressure control to adjust the level of the total volume of the gas or gases as the gas or gases flow through the plasma torch. The volume flow control also adjusts the volume flow portions producing the total volume flow of the gas or gases flowing through the plasma torch, thereby producing the desired gas composition.

Some embodiments of the invention include a gas mixture delivery apparatus that includes one or more pressure measures for measuring pressure of the gas or gases, a logic controller responsive to the pressure measures, and one or more volume flow controllers responsive to the logic controller for controlling gas volume flow. Such embodiments can be configured to allow for pressure to measured between the one or more volume flow controllers and the plasma torch. Some embodiments may also include a secondary gas mixture delivery apparatus for analogously controlling volume flow of a secondary gas or gases provided to the torch.

Those skilled in the art will realize that this invention is capable of embodiments that are different from those shown and that details of the disclosed invention can be changed in various manners without departing from its intended scope. Accordingly, the following drawings and descriptions are to be regarded as including such equivalents as do not depart from the spirit and scope of the invention.

BRIEF DESCRIPTION OF THE DRAWINGS

For a more complete understanding and appreciation of this invention, and many of its advantages, reference will be made to the following detailed description taken in conjunction with the accompanying drawings.

DETAILED DESCRIPTION

Figure 1:
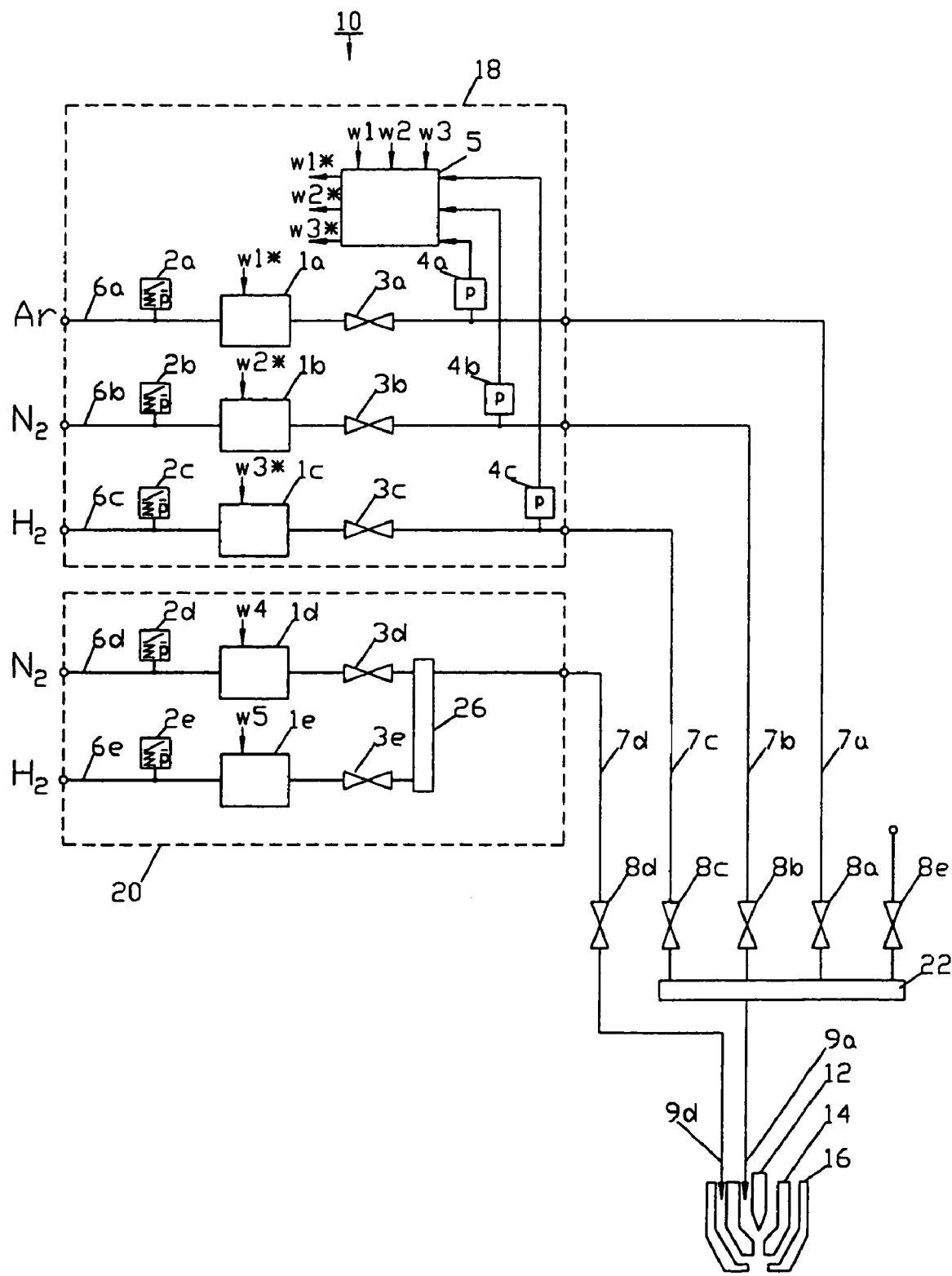
FIG. 1 depicts a schematic arrangement for supplying a plasma torch, in the form of a plasma cutting torch, with a plasma gas mixture and a secondary gas mixture in accordance with one embodiment of the invention.

FIG. 1 depicts an arrangement 10 for supplying a plasma torch in the form of a plasma cutting torch, the torch including an electrode 12, a plasma torch nozzle 14 and a secondary gas nozzle 16, and using an argon/hydrogen/nitrogen mixture for plasma cutting alloyed steels and non-ferrous metals. The arrangement 10 includes a plasma gas mixture delivery apparatus 18 having a single gas source (not shown) for each individual gas, namely argon (Ar), hydrogen ($H_2$) and nitrogen ($N_2$), of the plasma gas mixture (argon/hydrogen/nitrogen mixture). The plasma gas mixture delivery apparatus 18 receives plasma via respective source hoses 6a, 6b, and 6c and delivers plasma gases to a plasma gas mixer 22 via respective supply hoses 7a, 7b and 7c. Each of the source hoses 6a, 6b, and 6c and respective supply hoses 7a, 7b and 7c are capable of accommodating a volume flow portion of the total volume flow of gas to the plasma torch. The plasma gas mixer 22 is connected to the plasma torch nozzle 14 via a plasma gas mixture hose 9a.

FIG. 1 further depicts a secondary gas mixture delivery apparatus 20 for delivering a secondary gas mixture. In the arrangement 10 of FIG. 1, the secondary gases are nitrogen ($N_2$) and hydrogen ($H_2$), supplied to the secondary gas mixture delivery apparatus 20 from sources (not shown) for the individual gases via respective source hoses 6d and 6e. The secondary gas mixture delivery apparatus 20 delivers the secondary gas mixture via a gas supply hose 7d and a secondary gas mixture hose 9d to the secondary gas nozzle 16.

A separate pressure switch 2a, 2b, 2c, 2d, and 2e, volume flow controller 1a, 1b, 1c, 1d, and 1e, and supply solenoid valve 3a, 3b, 3c, 3d, and 3e, are arranged in respective series along each source hose 6a, 6b, 6c, 6d, and 6e. Within the plasma gas mixture delivery apparatus 18, there is also a pressure measure 4a, 4b, and 4c located downstream of each respective supply solenoid valve 3a, 3b and 3c. The pressure measures 4a, 4b and 4c are each connected via signal lines to a common logic controller 5, which in turn is connected to each of the volume flow controllers 1a, 1b and 1c via a respective control line. The volume flow controllers 1a, 1b and 1c are each responsive to the logic controller 5.

Downstream of the pressure measures 4a, 4b and 4c, delivery solenoid valves 8a, 8b and 8c are provided along the gas supply hoses 7a, 7b and 7c. Downstream of the delivery solenoid valves 8a, 8b and 8c, the gas supply hoses 7a, 7b, and 7c connect to a plasma gas mixer 22, which allows for mixing and supplying of the plasma gas mixture to the plasma gas mixture hose 9a.

In the secondary gas mixture delivery apparatus 20, the source hoses 6d and 6e are combined via a secondary gas mixer 26 into the supply hose 7d downstream of the supply solenoid valves 3d and 3e. The supply hose 7d connects the secondary gas mixer 26 to a delivery solenoid valve 8d. The secondary gas mixture hose 9d leads from the delivery solenoid valve 8d to the secondary gas nozzle 16 of the plasma torch.

In the operation of the arrangement 10 of FIG. 1, the pressure switches 2a, 2b and 2c monitor the presence of a minimum required gas pressure as the individual plasma gases, argon, nitrogen, and hydrogen, are delivered to the volume flow controllers 1a, 1b and 1c via the source hoses 6a, 6b and 6c. Individual volume flow set values w1, w2, and w3, each corresponding to one individual plasma gas and a corresponding volume flow portion, are related by the logic controller 5 according to the selected parameters for the respective volume flow controllers 1a, 1b and 1c.

Before the plasma cutting process begins, the supply solenoid valves 3a, 3b and 3c and, initially, the delivery solenoid valves 8a, 8b and 8c are opened to purge the source hoses 6a, 6b and 6c. The delivery solenoid valves 8a, 8b and 8c are then closed and the source hoses 6a, 6b and 6c are filled with respective plasma gases, via the volume flow controllers 1a, 1b and 1c, to the pressure determined by the logic controller 5, the pressure being detected by and monitored with the pressure measures 4a, 4b and 4c. The closed delivery solenoid valves 8a, 8b and 8c allow pressure to accumulate in the source hoses 6a, 6b and 6c and supply hoses 7a, 7b and 7c. It is advantageous for the source hoses 6a, 6b and 6c to be filled to the same pressure, for example 4 bar, to prevent equalization processes from occurring between the individual gases at the beginning of the plasma cutting process.

As the plasma cutting process begins, the supply solenoid valves 3a, 3b, and 3c and delivery solenoid valves 8a, 8b and 8c are all opened. This allows for the setting of the corresponding volume flows of the individual plasma gases and thus the total volume flow of the plasma gas mixture. This setting involves measuring pressure, with for example the pressure measure 4a, the measurement being evaluated by the logic controller 5. The pressure measurement is made while the supply solenoid valves 8a, 8b and 8c are all open so that each of the source hoses 6a, 6b and 6c are open to each other.

Some embodiments may also allow for measurement of individual gases by measuring individual mixed gases and forming a mean pressure determination. For example, it would also be possible for the logic controller 5 to evaluate all of the pressure measures 4a, 4b and 4c and then, for example, calculate a mean pressure based on the pressures measured. Alternatively, individual gases or individual mixed gases can be combined and the resulting pressure measured. This can allow for a reduction in the number of pressure measures needed and can serve to reduce the amount of equipment needed.

In the pre-flow period, which is immediately before the pilot arc is ignited, a defined plasma gas mixture is allowed to flow through the plasma torch at a preselected pressure, for example 4 bar. The resulting pressure is related to the logic controller 5 and processed to convert the selected volume flow set values w1, w2 and w3 into new volume flow set values w1*, w2* and w3*. This conversion allows for the setting of the desired pressure in the interior of the plasma torch at a constant gas mixture between the volume flow controllers 1a, 1b and 1c and the plasma torch.

Figure 3:
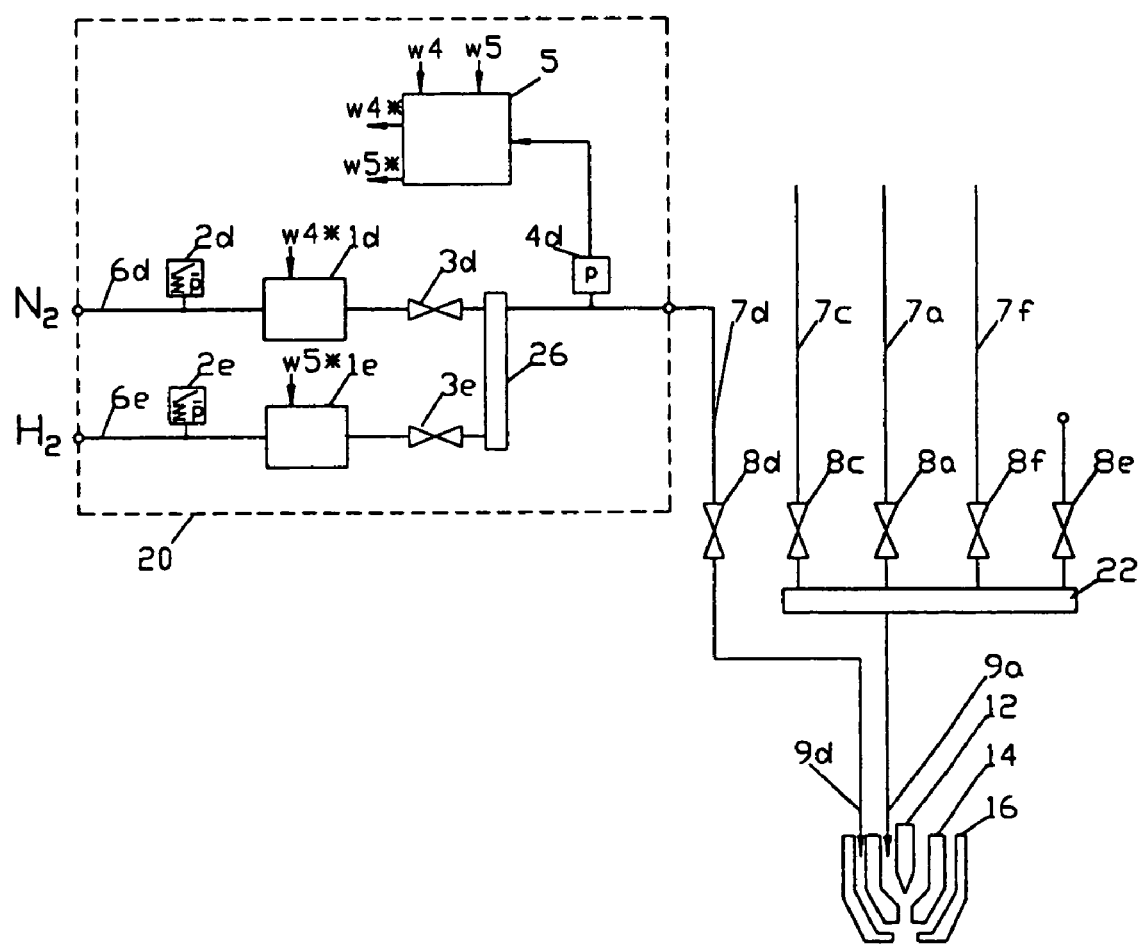
FIG. 3 depicts a schematic arrangement for supplying a plasma torch, in the form of a plasma cutting torch, with a secondary gas mixture in accordance with one embodiment of the invention.
Figure 4:
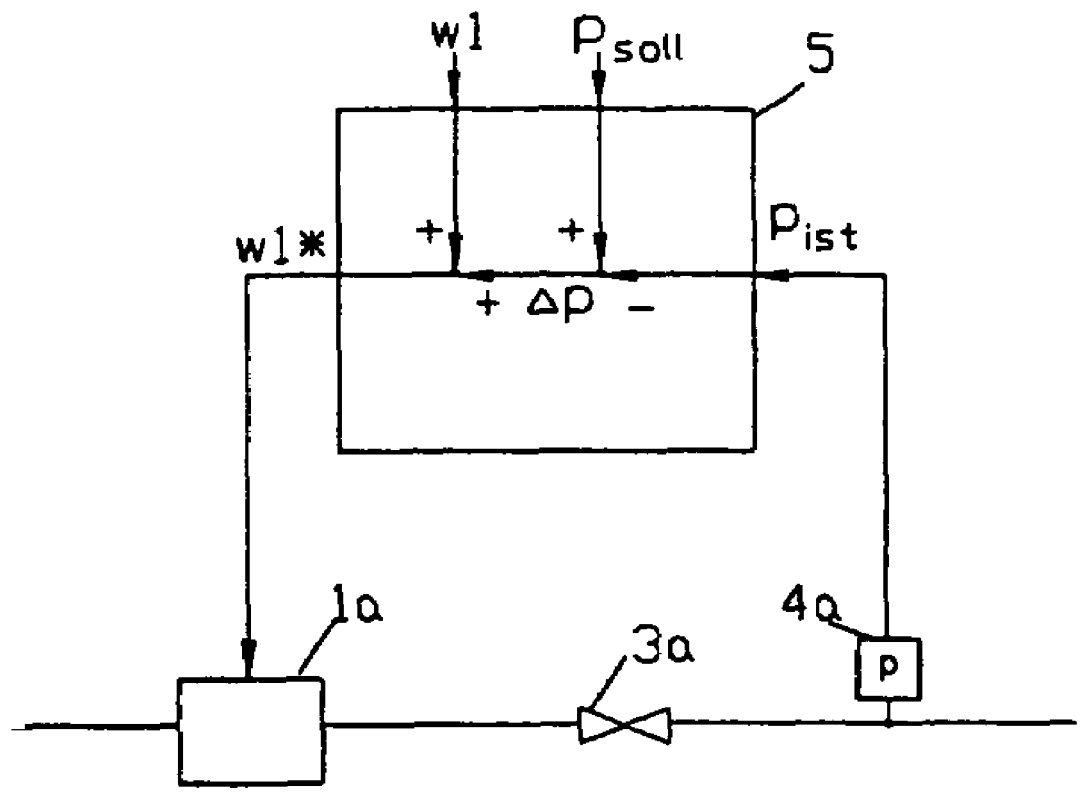
FIG. 4 depicts detail of the schematic arrangement of FIG. 1.

After ignition of the pilot arc, pressure is increased to a level required for the plasma cutting process, for example 6 bar. This is best understood by comparing FIG. 1 to FIG. 4, with FIG. 4 depicting example logic operational details of the logic controller 5 with respect to the pressure measure 4a and volume flow controller 1a along the source hose 6a for argon gas (Ar), the source hose 6a being capable of accommodating one volume flow portion of the total volume flow of gas. The pressure increase is effected by raising the pressure set value $p_{soll}$ within the logic controller 5, whereby the increased pressure set value $p_{soll}$ raises the volume flows of the individual plasma gases accordingly. This ensures that the desired pressure is always present in the interior of the plasma torch and further ensures that plasma gas mixing occurs in the desired ratio. This also allows for compensation in pressure fluctuations upstream of the plasma torch during certain operating conditions, for example when the current is reduced when cutting a corner or at the end of a cut.

The volume flows of the individual plasma gases, and thus the mixing ratio, are selected with the volume flow set values w1, w2 and w3. The pressure upstream of the plasma torch determines the pressure in the interior of the plasma torch between the electrode 12 and the plasma torch nozzle 14, and therefore also the volume flow that ultimately flows through the plasma torch nozzle 14. For example, referring to FIG. 4, the pressure achieved by the set volume flow is measured with the pressure measure 4a as the pressure actual value $p_{ist}$ and is related to the logic controller 5. If this pressure actual value $p_{ist}$ is not identical to the selected pressure set value $p_{soll}$, wherein the volume flow through the volume flow controllers 1a, 1b and 1c are not sufficient to achieve the pressure set value $p_{soll}$, the pressure difference $\Delta p = p_{soll} - p_{ist}$ is calculated. $\Delta p$ is then multiplied by a constant factor k, and the resulting product is added to the set value for the volume flow w1, w2 or w3, respectively, of the volume flow controllers 1a, 1b and 1c. This relation between a volume flow set value w and a new volume flow set value w* can be expressed with the following equation:

$$w^* = w + k \times \Delta p.$$

Accordingly, the values for the new volume flow set values are denoted w1*, w2* and w3*. Referring briefly to FIG. 4, if the pressure actual value $p_{ist}$ is greater than the pressure set value $p_{soll}$, $\Delta p$ is negative. As a result, the volume flow set values for the volume flow controllers 1a, 1b and 1c are reduced. Desired allowable ranges for volume flows, gas mixture ratios, and pressures can be electronically preselected with appropriate electronics, control software, and/or with other appropriate automation or controls.

Although the invention has been shown and described in an arrangement in which the volume flow of a mixture of argon, hydrogen, and nitrogen are controlled, it will be appreciated that the invention can also be used to regulate individual gases, including oxidizing gases and mixtures such as air and oxygen, and non-oxidizing gasses such as argon, hydrogen, nitrogen or mixtures thereof.

It is further contemplated that in some embodiments, plasma torches of the invention can be used to cut unalloyed steel using air and oxygen. Alternatively, plasma torches of the invention can also be used to cut alloyed steels using an argon/hydrogen/nitrogen mixture.

In addition, it is contemplated that some embodiments of the invention allow for plasma cutting and plasma marking by modifying the arrangement 10 depicted in FIGS. 1 and 4. Modifying the arrangement 10 for plasma cutting structural steel, for example, involves the use of oxygen as an alternate plasma gas. Modifying the arrangement 10 for plasma marking involves the use of an argon/nitrogen mixture. When switching between alternate plasma gases, such switching should preferably occur as quickly as possible in order to maintain high productivity. However, such switching must also be performed in a manner that ensures that the replaced or removed plasma gas has been removed completely from the arrangement 10.

Switching between plasma gases normally involves venting and purging the source hoses 6a, 6b and 6c completely prior to refilling with the new plasma gas mixture. Since plasma torch nozzles 14 frequently have a very small bore, often with a diameter on the order of 0.7 mm, this process can require a relatively long interval depending on the length of the hoses. Venting and purging intervals of 10 seconds or longer can be anticipated. To shorten this interval, an additional delivery solenoid valve 8e is provided to allow for the rapid venting of the supply hoses 7a, 7b and 7c when the delivery solenoid valves 8a, 8b or 8c are open. The inclusion of the additional delivery solenoid valve 8e can reduce venting and purging to an interval of less than 3 seconds.

Figure 2:
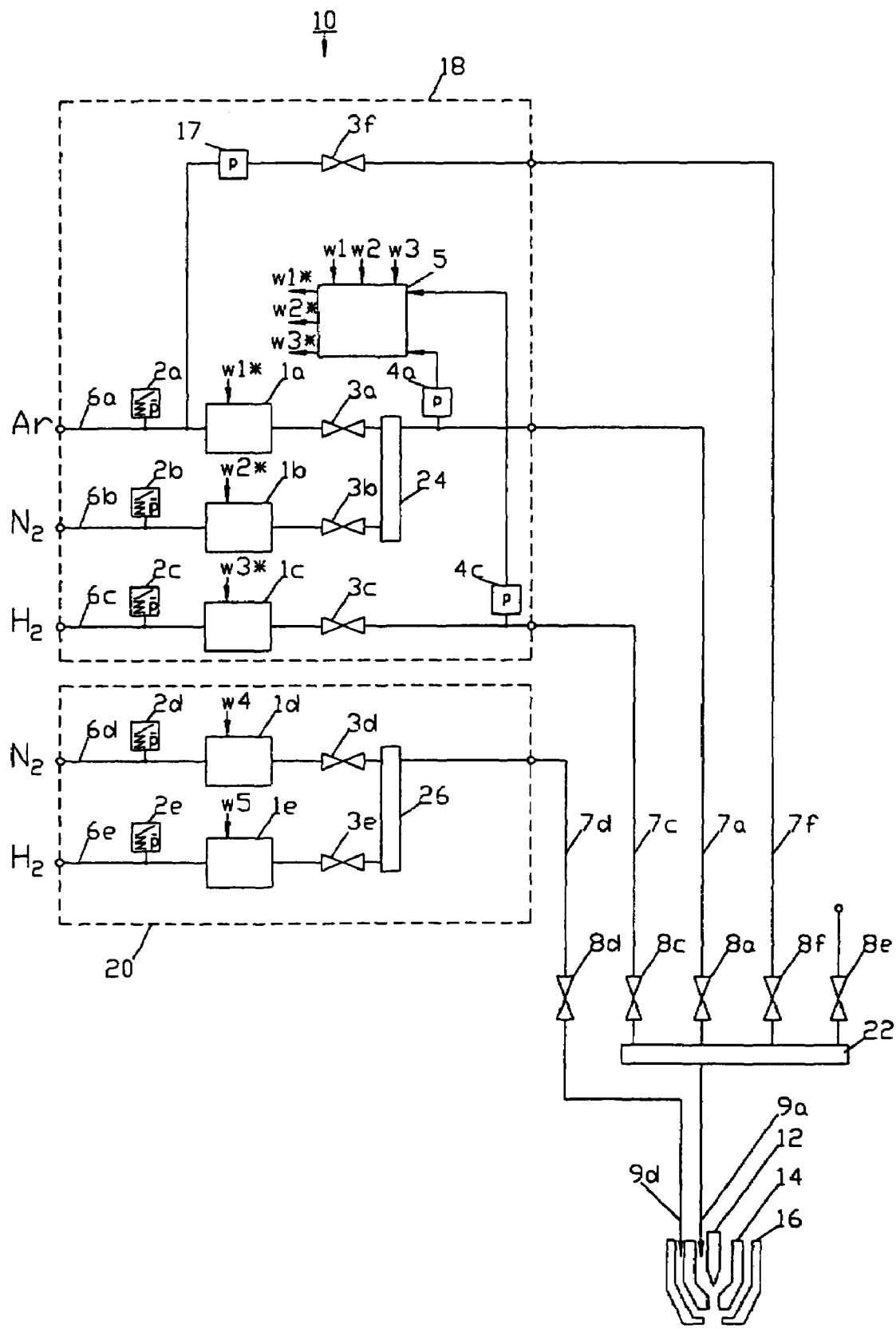
FIG. 2 depicts a schematic arrangement for supplying a plasma torch, in the form of a plasma cutting torch, with a plasma gas mixture and a secondary gas mixture in accordance with one embodiment of the invention.

FIG. 2 depicts an arrangement 10 of the invention that includes a combined pre-flow and post-flow gas delivery configuration, having a pre-delivery solenoid valve 3f, a supply hose 7f, and a delivery solenoid valve 8f, for delivering pre-flow and post-flow gases to the plasma torch separately. A pressure controller 17 controls the pressure of the pre-flow and post-flow gas. A plasma gas mixer 24 allows plasma gases argon and nitrogen to be mixed within the plasma gas mixture delivery apparatus 18.

The configuration of the arrangement 10 of FIG. 2 allows pre-flow gas to flow through the plasma torch at a different pressure, for example at 4 bar, than gases that are present at the delivery solenoid valves 8a and 8c which are delivered at the pressure required for plasma cutting, for example 6 bar, before the plasma cutting begins. This eliminates a need to adjust the pressure from 4 bar to 6 bar when the pilot arc is ignited.

During the pre-flow period, the supply solenoid valves 3a, 3b, 3c, pre-delivery solenoid valve 3f, and delivery solenoid valve 8f are all open. The supply hoses 7a and 7c are filled by the volume flow controllers 1a and 1c up to the pressure determined by the logic controller 5, which is detected by the pressure measures 4a and 4c. The delivery solenoid valves 8a and 8c of the plasma torch are closed so that an adequate pressure, for example 6 bar, can accumulate.

After the pilot arc is ignited, the delivery solenoid valves 8a and 8c are opened while the pre-delivery solenoid valve 3f and delivery solenoid valve 8f are closed. The pressure values measured by the pressure measure 4a are processed in the logic controller 5. The logic controller 5 then adjusts the volume flows of the individual gases to the desired pressure to ensure that the desired plasma gas mixing ratio is continuously supplied to the plasma torch. After the plasma cutting has finished, the delivery solenoid valves 8a and 8c are closed while the pre-delivery solenoid valve 3f and delivery solenoid valve 8f are opened. This allows for post-flow gas to then be supplied to the plasma torch.

In the arrangements 10 of both FIGS. 1 and 2, the secondary gas is controlled only by the volume flow controllers 1d and 1e, which keep the secondary gas volume flow constant throughout the entire plasma cutting process while the supply solenoid valves 3d and 3e and the delivery solenoid valve 8d are open. This can usually be sufficient for operation if the plasma torch is constructed such that the bore of the secondary gas nozzle 16 is not significantly narrowed by a plasma jet, and normally applies to plasma torches in which the bore of the secondary gas nozzle 16 is at least twice as large as the plasma torch nozzle 14.

When such diameter ratios are smaller, the secondary gas must be supplied using a method similar to the method used for supplying the plasma gas. For example, FIG. 3 depicts a secondary gas mixture delivery apparatus 20 of the invention in which a combined volume flow and pressure control of the secondary gas is incorporated with the inclusion of an additional pressure measure 4d connected to the logic controller 5, corresponding by analogy with the volume flow and pressure control employed in supplying plasma gas in accordance with FIGS. 1 and 2.

It will be appreciated that the invention can be incorporated into a variety of plasma technologies, such as plasma welding, plasma gouging and plasma marking, where plasma gas is supplied to a work piece.

It will be further appreciated that while the invention has been shown and described as having pressure in the interior of a plasma torch measured indirectly via pressure measures upstream of the plasma torch, such as with the pressure measures 4a, 4b and 4c of FIG. 1, some embodiments will allow for direct measuring of the pressure within the interior of the plasma torch without departing from the contemplated scope of the invention.

In some embodiments, it may be advantageous for at least one volume flow to be controlled on the basis of a calorimetric measurement of the volume flow, on the basis of the measurement of the volume flow from the differential pressure, or on the basis of a pulse measurement.

It can also be advantageous if, before being supplied with the gas, mixed gas or gas mixture, the plasma torch is separately supplied with a pre-flow gas at a controlled pressure. The torch can also be advantageously separately supplied with a post-flow gas at a controlled pressure.

The quality of a cut is ultimately dependent on the volume flow actually passing through the plasma torch nozzle 14, and not on the gas volume flow flowing through the volume flow controllers 1a, 1b, and 1c. Due to the presence of gas hoses 7a, 7b, and 7c connecting the plasma torch to volume flow controllers 1a, 1b, and 1c, volume flow through the volume flow controllers 1a, 1b, and 1c may not be identical to the volume flow actually passing through the plasma torch nozzle 14. The difference between the volume flow in the volume flow controllers 1a, 1b, and 1c and the plasma torch nozzle 14 is due to the volume of the gas hoses therebetween and the compressibility of gases.

This is particularly noticeable in transitions between the different operating conditions that occur during plasma cutting. In the interior of the plasma torch, between the electrode 12 and the plasma torch nozzle 14, depending on the operating condition, such as the start-up of the process, the pilot arc, the main arc and the end of the process, different internal pressures are required in order to achieve a particular volume flow. Such are generated by the changing arc currents, which produce different diameters of the plasma jet. In this way, the nozzle channel is narrowed. For example, the currents may be 10 to 25 A in the pilot arc, and 20 to 1000 A in the main arc.

The invention allows for quick reactions to rapidly changing pressure conditions in the interior of the plasma torch, especially during the transition processes, such as igniting the pilot arc, transferring the pilot arc to a work piece, and forming the main arc (cutting), without altering the mixing ratio of the gas mixture. This is done by superimposing the result of the pressure measurement on the set value of the volume flow control in such a way that a pressure independent of the operating condition of the plasma torch is created in the space between the volume flow controllers 1a, 1b, and 1c and the plasma torch, or in the interior of the plasma torch. The mixing ratio of the gas mixture remains unchanged. Thus an ideal plasma gas mixture is available for the cutting process from the outset.

Both individual gases and the individual gases of gas mixtures can be controlled over wide ranges, and thus be adapted to a particular cutting task. This allows for a high level of reproducibility in cutting results.

Volume flow can also be set with the aid of devices such as proportional valves or motor operated valves. Pressure measurement, such as that performed by the pressure measures 4a, 4b, and 4c, can be performed by pressure transmitters which are well known in the art.

Volume flow control and pressure control can be analogue or digital and can be actuated accordingly. Measured volume flow can be visualised and monitored.

The method of the invention can be integrated into a quality control and documentation system. Evaluations together with other process parameters enable conclusions to be drawn with regard to cutting quality.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A method of supplying a plasma torch with at least one gas in which the volume flow of the at least one gas is controlled, the method comprising:
   determining a desired composition of the at least one gas to be supplied to a plasma torch;
   providing, from at least one gas source, a volume of the desired composition of the at least one gas to the plasma torch;
   effecting volume flow control of the at least one gas to the plasma torch by using pressure control to adjust the level of the total volume of the at least one gas flowing through the plasma torch and using volume flow control to adjust volume flow portions producing the total volume flow of the at least one gas flowing through the plasma torch, thereby producing the desired composition of the at least one gas; and
   controlling the at least one volume flow of the at least one gas on the basis of at least one of calorimetric measurement of the volume flow, measurement of the volume flow from differential pressure, and measurement of the pulse movement of the volume flow.

2. The method of claim 1 further comprising supplying the at least one gas as a mixed gas to the plasma torch.

3. The method of claim 1 further comprising supplying the at least one gas as a gas mixture to the plasma torch.

4. The method of claim 1 further comprising measuring the pressure of the at least one gas upstream of the plasma torch.

5. The method of claim 1 further comprising directly measuring the pressure of the at least one gas between an electrode and a nozzle in the interior of the plasma torch.

6. The method of claim 1 further comprising using at least one volume flow controller to effect volume flow control of the at least one gas, and measuring pressure of the at least one gas between the at least one volume flow controller and the plasma torch.

7. The method of claim 1 further comprising, using at least one volume flow controller to effect volume flow control of the at least one gas, and measuring pressures of individual gases of the at least one gas between the at least one volume flow controller and the plasma torch and forming a mean pressure from measured pressures of individual gases.

8. The method of claim 1 further comprising combining individual gases of the at least one gas and measuring a resulting pressure.

9. The method of claim 1 further comprising combining at least two individual gases of the at least one gas and measuring a resulting pressure.

10. The method of claim 1 further comprising controlling the volume flow of a gas mixture of the at least one gas by controlling the volume flows of individual gases of the at least one gas.

11. The method of claim 1 further comprising supplying the plasma torch with an additional secondary gas that is controlled.

12. The method of claim 1 further comprising supplying the plasma torch with an additional secondary mixed gas that is controlled.

13. The method of claim 1 further comprising supplying the plasma torch with an additional secondary gas mixture that is controlled.

14. The method of claim 1 further comprising supplying the plasma torch with at least one additional secondary gas and effecting volume flow control of the at least one additional secondary gas by using pressure control to adjust the level of the total volume of the at least one additional secondary gas flowing through the plasma torch and using volume flow control to adjust volume flow portions producing the total volume flow of the at least one additional secondary gas supplied to the plasma torch, thereby producing the desired composition of the at least one additional secondary gas.

15. The method of claim 1 further comprising separately supplying the plasma torch, with at least one pre-flow gas at a controlled pressure before supplying the plasma torch with the at least one gas.

16. The method of claim 1 further comprising separately supplying the plasma torch with at least one post-flow gas at a controlled pressure after supplying the torch with the at least one gas.

17. The method of claim 1 further comprising supplying the at least one gas as at least one of plasma gas, plasma mixed gas, and plasma gas mixture.

18. An arrangement for supplying a plasma torch with at least one gas in which the volume of the at least one gas is controlled, the arrangement comprising:
   at least one gas source for providing at least one gas to be supplied to the plasma torch;
   at least one volume flow portion to produce a total volume flow of the at least one gas to the plasma torch;
   an effected volume flow control for controlling volume flow of the at least one gas to the plasma torch, said volume flow control using pressure control to adjust the level of the total volume of the at least one gas flowing through the plasma torch, said volume flow control adjusting the volume flow portions producing the total volume flow of the at least one gas flowing through the plasma torch, thereby producing the desired composition of the at least one gas; and
   said volume flow control controlling the at least one volume flow of the at least one gas on the basis of at least one of calorimetric measurement of the volume flow, measurement of the volume flow from differential pressure, and measurement of the pulse movement of the volume flow.

19. The arrangement of claim 18, the gas supplied to the plasma torch being a mixed gas.

20. The arrangement of claim 18, the gas supplied to the plasma torch being a gas mixture.

21. The arrangement of claim 18, the arrangement having a gas mixture delivery apparatus comprising:
- at least one pressure measure, said pressure measure being responsive to the pressure of at least one of the volume flow portions;
- at least one logic controller, said logic controller being responsive to said at least one pressure measure; and
- at least one volume flow controller positioned to control volume flow of at least one of the volume flow portions.

22. The arrangement of claim 18 further comprising at least one pressure measure for directly measuring pressure of the at least one gas between an electrode and a torch nozzle in the interior of the plasma torch.

23. The arrangement of claim 18 further comprising at least one pressure measure for measuring pressure of each of said at least one volume flow portion.

24. The arrangement of claim 18 further comprising a single pressure measure for measuring pressure of all of said at least one volume flow portion.

25. The arrangement of claim 18 further comprising at least one pressure measure for measuring the pressure of each of said at least one gas.

26. The arrangement of claim 18 further comprising a single pressure measure for measuring the pressure of all of said at least one gas.

27. The arrangement of claim 18 further comprising a single pressure measure for measuring the pressure of at least two of said at least one gas that are combined.

28. The arrangement of claim 18 further comprising a separate volume flow controller for controlling the volume flow for each of said at least one gas.

29. The arrangement of claim 18 further comprising a separate volume flow controller for controlling the volume flow of each of said at least one volume flow portion.

30. The arrangement of claim 18 further comprising a secondary gas mixture delivery apparatus for supplying the plasma torch with at least one secondary gas that is controlled.

31. The arrangement of claim 18 further comprising a secondary gas mixture delivery apparatus for supplying the plasma torch with at least one secondary gas, said gas mixture delivery apparatus using an effected secondary volume flow control to control volume flow of the at least one secondary gas to the plasma torch, said secondary volume flow control using pressure control to adjust the level of the total volume of the at least one secondary gas flowing through the plasma torch, said secondary volume flow control adjusting the volume flow portions producing the total volume flow of the at least one secondary gas flowing through the plasma torch, thereby producing the desired composition of the at least one secondary gas.

32. The arrangement of claim 18 further comprising a pre-flow gas delivery apparatus for separately delivering at least one pre-flow gas to the plasma torch, the pressure of the at least one pre-flow gas being controlled.

33. The arrangement of claim 18 further comprising a post-flow gas delivery apparatus for separately delivering at least one post-flow gas to the plasma torch, the pressure of the at least one post-flow gas being controlled.

34. The arrangement of claim 18, the at least one gas being supplied as at least one of plasma gas, plasma mixed gas, and plasma gas mixture.

* * * * *